United States Patent
Walsh

(10) Patent No.: US 9,501,125 B2
(45) Date of Patent: *Nov. 22, 2016

(54) SYSTEMS AND METHODS FOR IMPLEMENTING REDUCED POWER STATES

(71) Applicant: Intel Corporation, Santa Clara, CA (US)

(72) Inventor: Jim Walsh, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 467 days.

This patent is subject to a terminal disclaimer.

(21) Appl. No.: 13/850,920

(22) Filed: Jul. 8, 2013

(65) Prior Publication Data

US 2013/0283075 A1    Oct. 24, 2013

Related U.S. Application Data

(63) Continuation of application No. 12/828,221, filed on Jun. 30, 2010, now Pat. No. 8,407,504.

(51) Int. Cl.
*G06F 1/32*      (2006.01)

(52) U.S. Cl.
CPC ........... *G06F 1/3203* (2013.01); *G06F 1/3253* (2013.01); *Y02B 60/1235* (2013.01)

(58) Field of Classification Search
CPC ............................... G06F 1/324; G06F 1/3203
USPC ...................................................... 713/323
See application file for complete search history.

(56) References Cited

U.S. PATENT DOCUMENTS

| | | | |
|---|---|---|---|
| 7,325,733 B2 | 2/2008 | Wurzburg et al. | |
| 7,607,029 B2 | 10/2009 | Tseng et al. | |
| 7,647,517 B2 | 1/2010 | Tseng et al. | |
| 7,721,031 B2 | 5/2010 | Tseng et al. | |
| 7,743,269 B2 | 6/2010 | Marks et al. | |
| 7,809,969 B2 | 10/2010 | Das Sharma et al. | |
| 7,849,340 B2 | 12/2010 | Tseng et al. | |
| 7,984,314 B2 | 7/2011 | Cooper et al. | |
| 9,122,481 B2 * | 9/2015 | Unnikrishnan | G06F 1/3209 |
| 2005/0156038 A1 | 7/2005 | Wurzburg et al. | |
| 2006/0047984 A1 | 3/2006 | Ho et al. | |
| 2006/0149977 A1 | 7/2006 | Cooper | |
| 2006/0262839 A1 | 11/2006 | Tseng et al. | |
| 2006/0265611 A1 | 11/2006 | Wang et al. | |
| 2006/0265612 A1 | 11/2006 | Tseng et al. | |
| 2006/0271651 A1 | 11/2006 | Tseng et al. | |
| 2008/0209246 A1 | 8/2008 | Marks et al. | |

(Continued)

FOREIGN PATENT DOCUMENTS

| | | |
|---|---|---|
| CN | 1763694 | 4/2006 |
| JP | 2004-199115 A | 7/2004 |

(Continued)

OTHER PUBLICATIONS

ExpressCard Standard, Release 2.0; Dated Feb. 2009, 85 pages.*

(Continued)

*Primary Examiner* — Brian Misiura
(74) *Attorney, Agent, or Firm* — Trop, Pruner & Hu, P.C.

(57) ABSTRACT

In some embodiments, provided is a way for devices to request S0ix (or the like) entry and exit.

16 Claims, 1 Drawing Sheet

(56) References Cited

U.S. PATENT DOCUMENTS

| | | | |
|---|---|---|---|
| 2008/0288798 | A1 | 11/2008 | Cooper et al. |
| 2009/0327774 | A1 | 12/2009 | Jeyaseelan et al. |
| 2010/0115311 | A1 | 5/2010 | Tseng et al. |
| 2010/0169685 | A1 | 7/2010 | Gough et al. |
| 2011/0233999 | A1 | 9/2011 | Browning |
| 2011/0249022 | A1 | 10/2011 | Poornachandran et al. |
| 2011/0296222 | A1 | 12/2011 | Tan et al. |
| 2011/0320835 | A1 | 12/2011 | Browning |
| 2014/0195835 | A1* | 7/2014 | E. .................... G06F 1/3253 713/323 |

FOREIGN PATENT DOCUMENTS

| | | |
|---|---|---|
| JP | 2005-196352 A | 7/2005 |
| JP | 2008-305195 A | 12/2008 |
| JP | 2010-122858 A | 3/2010 |
| TW | 200641620 | 11/2005 |
| TW | 200603001 | 1/2006 |
| TW | 200608182 | 3/2006 |
| TW | 200641623 A | 12/2006 |
| WO | 2012/012144 A2 | 1/2012 |
| WO | 2012/012144 A3 | 10/2012 |

OTHER PUBLICATIONS

Intel—"82573 Family of GbE Controllers" Revision 2.5; Dated 2007, 39 pages.*

Office Action received for Taiwan Patent Application No. 100122246, mailed on May 14, 2014, 6 pages of Office Action and 9 Pages of English Translation.

Office Action Received for Korean Patent Application No. 2012-7034219, mailed on Apr. 23, 2014, 3 Pages of English Translation only.

Office Action Received for Japanese Patent Application No. 2013-518584, mailed on Feb. 25, 2014, 3 Pages of Japanese Office Action and 2 Pages of English Translation.

"PCI-SIG Engineering Change Notice"; PCI-SIG; Aug. 23, 2012; all pages.

International Search Report and Written Opinion received for PCT Application No. PCT/US2011/042230, mailed on Jul. 31, 2012, 10 pages.

International Preliminary Report on Patentability received for PCT Application No. PCT/US2011/042230, mailed on Jan. 17, 2013, 8 pages.

State Intellectual Property Office, P.R. China, First Office Action mailed Feb. 2, 2015 in Chinese Patent Application No. 201180004556.2.

State Intellectual Property Office, P.R. China, Second Office Action mailed Oct. 10, 2015 in Chinese Patent Application No. 201180004556.2.

State Intellectual Property Office, P.R. China, Third Office Action mailed Mar. 15, 2016 in Chinese Patent Application No. 201180004556.2.

Japan Patent Office, Notification of Reasons for Refusal, mailed Feb. 25, 2014 in Japanese Patent Application No. 2013-518584.

Taiwan Intellectual Property Office, Office Action mailed Jun. 24, 2015 in Taiwanese Patent Application No. 103135191.

European Patent Office, Extended Search Report mailed Sep. 4, 2015 in European Patent Application No. 118101404.7.

* cited by examiner

SYSTEMS AND METHODS FOR IMPLEMENTING REDUCED POWER STATES

TECHNICAL FIELD

The present invention relates generally to reduced power states in computing platforms.

BRIEF DESCRIPTION OF THE DRAWINGS

Embodiments of the invention are illustrated by way a example, and not by way of limitation, in the figures of the accompanying drawings in which like reference numerals refer to similar elements.

DETAILED DESCRIPTION

Figure 1:
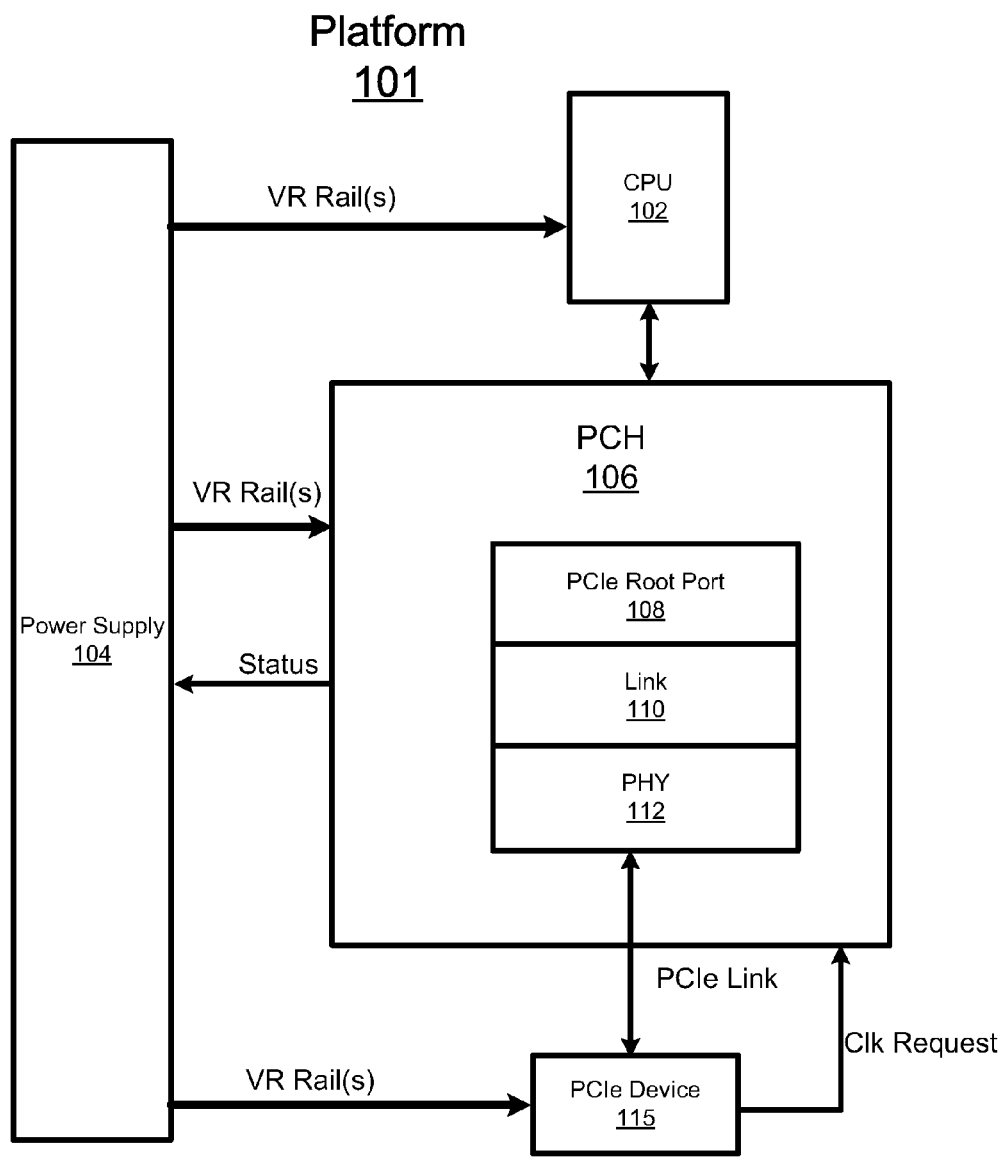
FIG. 1 is a diagram of a portion of a system having a port with efficient power reduction state entry in accordance with some embodiments.

Computing platforms (platform hardware in combination with an operating system such as Windows™) can normally enter lower power states. For example, so-called "S" states (S0, S3, S4, and S5) states may be implemented with Windows™ and other operating systems, along with popular interfaces such as PCI Express and USB3.

In some systems, S0 may be the most active state, S3 may be a standby state, S4 may be a hibernate state, and S5 may be an off state. Within the most active state. (S0), there may be further sub-states of differing activity for conserving power in the. platform. One of these states may be referred to as an S0ix state. In this state, hardware components such as PCIe devices and the system controller and/or platform control portions can be in reduced power modes, even though the system is in the S0 (active) state.

S0ix entry and exit generally require coordination between a system controller, e.g., within a platform control block such as a platform controller hub ("PCH") and PCIe (Peripheral Component Interface Express) devices. With conventional technology, a device typically initiates S0ix exit (to enter a more active operational mode) by initiating an L1 (low power PCIe link state) exit. Unfortunately, this generally requires both the device's and the system controller, e.g., their PHY and Link layers to remain powered when in the S0ix (reduced power) mode, and for the system controller to be monitoring for L1 exit initiation by the device. That is, even though a PCIe link between a device and port may be idle, both partners may need to remain powered, at least to some degree, in case link activity is to occur.

Accordingly, in some embodiments, provided is a way for devices to request S0ix (or the like) entry and exit without some of the drawbacks of prior art solutions. For example, in some embodiments, it may allow a system controller to remove much (if not all) power from the PCIe Physical and Link layer circuitry during S0ix, In some embodiments, it may allow devices (e.g., PCIe devices) to remove most (if not all) power from its Physical and Link layer circuitry during an. S0ix state. in some embodiments, it may allow the system power supply to be placed m a lower power state during S0ix under suitable conditions.

FIG. 1 generally shows a portion of a computing platform 101 such as a portable computer, desktop or server computer, tablet, netbook, smart phone, etc, it comprises a CPU (central processing unit) chip 102, a power supply 104, and a system (or platform) control block 106. in some embodiments, the platform control block 106 may be implemented with a platform controller hub (PCH), which for convenience, will be used for reference to a platform control block in general. (Note that the CPU and PCH could correspond to separate chips or to functional blocks in a chip such as a system-on-chip (SOC) or other highly integrated computing chip.)

The PCH 106 comprises one or more PCIe ports 108 with associated link and PHY layers, 110, 112, respectively. The port 108 is made to be coupled with a corresponding PCIe device 115 (such as a wireless network card. Ethernet card, USB bridge etc.). When coupled together through their respective interfaces, they may form an active PCIe link and communicate with one another. (Note that the PCH 106 may comprise other ports and controllers such as audio ports, USB ports, hard-drive controllers, platform power controllers, and the like. Also, a single PM device is shown for simplicity but multiple devices could be coupled to multiple ports within the PCH).

While not all interface signals are shown, besides link signals (e.g., transmit and receive lanes that may make up the referenced "PCIe link"), their interfaces may also include a clock request (Clk Request) signal. In some embodiments, the Clk Request signal may be asserted by a system controller in the PCH) or the device so that either link partner can inform the other that it needs to make a communication. For example, it may use wire-OR signaling. A device 115 uses this Clk Request signal to request a reference clock (not shown) from the port so that it may communicate with the port. With conventional systems, the Clk Request signal is normally only used to make this reference clock activation request, but with some embodiments disclosed herein, it is also used to indicate whether or not the device can enter, desires to, or will enter into a less active (e.g., S0ix) state. In some embodiments, this can allow the device to reduce power from its link and PHY layer circuitry, and it can also allow the system controller to reduce (e.g., remove) power in the PCH port's corresponding link and PHY layers.

When the Clk Request signal is assertable by the system controller (system) or the device, the system may assert it to inform the device that the system is not in S0ix and may initiate access with the device. So when a device is in an inactive state, either or both the system link/PHY and device link/PHY circuitry may be powered down. On its own initiative, the PCIe device may enter a reduced power state by de-asserting Clk Request and then asserting Clk Request when it needs to come out of the reduced power mode (e.g., to send a PCIe transmission, which may require the system to re-power the corresponding PCIe port/link/PHY circuitry, as well as provide power (or more power) to the device.)

In some embodiments, the PCH system controller may disallow the. PCH to enter the S0ix state while, any device is active (i.e. if any Clk Request signal from any PCIe device is asserted). The system may also prevent a system level S0ix state or initiate S0ix exit if other PCH functions are to be active. The system may use the transition to the asserted state (exiting out of S0ix state) to cause power to be reapplied to the port's PHY and Link layer circuitry 110, 112. Once the power is reapplied, the state of the system controller's PHY and Link layers is restored, and, for example, a normal L1 exit process may be initiated.

Thus, in some embodiments, for the system to be in the S0ix state, a sufficient number (e.g., some or all) of its ports, controllers, etc. should be in a lower power (e.g., S0ix) state. Once the system is in an S0ix state, the system power supply (power rails from the power supply to the PCH) may be placed in a lower power state by applying an appropriate status signal, e.g., by asserting a VR Idle Enable signal. If the device (or any other device) wishes to become active, it may assert Clk Request, which then results in the system reasserting the power supply, not only to the system, but also to the device(s) that are to become active (if the system controls power to the device(s)). In some embodiments, a device may include circuitry so that it waits a specified amount of time after Clk Request assertion to fully activate itself in order to give the power supply and PCH sufficient time, e.g., to avoid power droops, transients, etc. In other schemes, for example, it could wait until it perceives the reference clock from the PCH after asserting the Clk Request signal. Note that when an individual device is powered down (its Clk Request de-asserted), the system may otherwise inform the power supply, so that it is able to provide sufficient power when needed, i.e., to reduce. transients and the like.

In the preceding description, numerous specific details have been set forth. However, it is understood that embodiments of the invention may be practiced without these specific details. In other instances, well-known circuits, structures and techniques may have not been shown in detail in order not to obscure an understanding of the description. With this in mind, references to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical, contact with each other. "Coupled" is used to indicate that two or more elements co-operate or interact with each other, but they may or may not be in direct physical or electrical contact.

The term "PMOS transistor" refers to a P-type metal oxide semiconductor field effect transistor. Likewise, "NMOS transistor" refers to an N-type metal oxide semiconductor field effect transistor. It should be appreciated that whenever the terms: "MOS transistor", "NMOS transistor", or "PMOS transistor" are used, unless otherwise expressly indicated or dictated by the nature of their use, they are being used in an exemplary manner. They encompass the different varieties of MOS devices including devices with different VTs, material types, insulator thicknesses, gate(s) configurations, to mention just a few. Moreover, unless specifically referred to as MOS or the like, the term transistor can include other suitable transistor types, e.g., junction-field-effect transistors, bipolar-junction transistors, metal semiconductor FETs, and various types of three dimensional transistors, MOS or otherwise, known today or not yet developed.

The invention is not limited to the embodiments described, but can be practiced with modification and alteration within the. spirit and scope of the appended claims. For example, it should be appreciated that the present invention is applicable, for use with all types of semiconductor integrated circuit ("IC") chips, Examples of these IC chips include, but are not limited to processors, controllers, chip set components, programmable logic arrays (PLA), memory chips, network chips, and the like, It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise, one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ranges may have been given, although the present invention is not limited to the same. As manufacturing techniques (e.g., photolithography) mature over time, it is expected that devices of smaller size could be manufactured, In addition, well known power/ground connections to IC chips and other components may or may not be shown within the FIGURE for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. An apparatus, comprising:
a first component having a first-component port to be coupled to a second-component port of a second component, the first-component port to communicate a clock request signal to be asserted by either the first-component port or the second-component port to exit a reduced power state.

2. The apparatus of claim 1, in which the clock request signal is to be used in a first mode to control availability of a reference clock for the second-component port and is to be used in a second mode to change a power state of the first-component port.

3. The apparatus of claim 1, in which the first component is a processor.

4. The apparatus of claim 3, in which the processor has a controller to enter at least a part of the processor into the reduced power state if a number of functions including the second component are to be in the reduced power state.

5. The apparatus of claim 1, in which the ports are PCI Express ports.

6. The apparatus of claim 1, in which the first-component port has PHY circuitry to which power is removed in response to entry into the reduced power state.

7. The apparatus of claim 1, in which the first-component and second-component ports, when coupled together, form a PCIe link, the clock request signal comprising a sideband signal for the link.

8. A computing platform, comprising:

a processor;

a power supply; and a controller comprising a system controller and at least one port to communicate with a device, the port to communicate a clock request signal for the device to assert when exiting a reduced power mode, the system controller to increase power supplied to PHY circuitry for the port when the clock request signal is asserted, wherein the clock request signal is assertable by both the system controller and the device.

9. The platform of claim 8, in which the port is a PCI Express port.

10. The platform of claim 8, wherein the system controller is to enter into a reduced power mode if a number of functions including the device is to be in the reduced power mode.

11. The platform of claim 8, in which the controller is part of the processor.

12. An apparatus, comprising:

a device to be conductively coupled to a host component to form a communications link to communicate a clock request signal to be assertable by either the device or the host component to exit a reduced power state of the communications link.

13. The apparatus of claim 12, in which the host component is a processor.

14. The apparatus of claim 13, in which the processor has a controller to enter at least a part of the processor into the reduced power state if a number of functions including the device are to be in the reduced power state.

15. The apparatus of claim 12, in which the device and host component are conductively coupled through PCI Express ports.

16. The apparatus of claim 12, in which the device has PHY circuitry to which power is removed in response to entry into the reduced power state.

* * * * *